(12) United States Patent
Barth et al.

(10) Patent No.: US 7,564,628 B2
(45) Date of Patent: Jul. 21, 2009

(54) MULTIPLE BAND REFLECTOR WITH METAL AND DIELECTRIC LAYERS

(75) Inventors: Steven Allen Barth, Martinsville, VA (US); Jaime Antonio Li, Martinsville, VA (US)

(73) Assignee: CPFilms, Inc.

( * ) Notice: Subject to any disclaimer, the term of this patent is extended or adjusted under 35 U.S.C. 154(b) by 300 days.

(21) Appl. No.: 11/422,597

(22) Filed: Jun. 6, 2006

(65) Prior Publication Data

US 2007/0279748 A1 Dec. 6, 2007

(51) Int. Cl.
G02B 1/10 (2006.01)

(52) U.S. Cl. ............... 359/582; 359/584; 359/586; 359/588; 359/589

(58) Field of Classification Search ........... 359/584, 359/582, 586, 588, 589
See application file for complete search history.

(56) References Cited

U.S. PATENT DOCUMENTS

| | | | |
|---|---|---|---|
| 3,682,528 A | 8/1972 | Apfel | |
| 4,009,453 A | 2/1977 | Mahlein | |
| 4,705,356 A | 11/1987 | Berning | |
| 4,930,866 A | 6/1990 | Berning | |
| 5,179,469 A | 1/1993 | Hall | |
| 5,214,530 A | 5/1993 | Coombs | |
| 5,783,360 A | 7/1998 | Phillips | |
| 5,948,538 A | 9/1999 | Brochot | |
| 5,993,950 A | 11/1999 | Novis | |
| 6,031,653 A | 2/2000 | Wang | |
| 6,034,813 A | 3/2000 | Woodard | |
| 6,034,820 A | 3/2000 | Someno | |
| 6,157,486 A | 12/2000 | Benson | |
| 6,159,607 A | 12/2000 | Hartig | |
| 6,262,830 B1 | 7/2001 | Scalora | |
| 6,531,230 B1 | 3/2003 | Weber | |
| 6,760,157 B1 | 7/2004 | Allen | |
| 6,835,796 B2 | 12/2004 | Sakamoto | |
| 6,896,938 B2 | 5/2005 | Kastner | |
| 7,042,540 B2 | 5/2006 | Yano | |
| 7,052,747 B2 | 5/2006 | Nishikouji | |
| 2002/0126265 A1 | 9/2002 | Okura | |
| 2003/0156326 A1 | 8/2003 | Lotz | |
| 2004/0094850 A1 | 5/2004 | Bonkowski | |
| 2004/0127594 A1* | 7/2004 | Yang et al. ............ | 522/114 |
| 2004/0184150 A1 | 9/2004 | Johnson | |
| 2004/0184151 A1 | 9/2004 | Schilling | |
| 2004/0189908 A1 | 9/2004 | Kawamoto | |
| 2004/0240053 A1 | 12/2004 | Shimoda | |
| 2005/0142376 A1 | 6/2005 | Kastner | |
| 2005/0275937 A1 | 12/2005 | Wu | |
| 2006/0108050 A1 | 5/2006 | Satake | |
| 2006/0222796 A1* | 10/2006 | Morris ............ | 428/35.7 |

* cited by examiner

*Primary Examiner*—Joshua L Pritchett
(74) *Attorney, Agent, or Firm*—Brenc Law

(57) ABSTRACT

Now, according to the present invention, multiple band optical reflectors are provided that utilize a stack of metal and dielectric layers to create a reflection curve in the visible spectrum that has multiple peak intensities. Reflectors of the present invention comprise at least two dielectric layers that have differing thicknesses, with metal layers disposed therebetween. The use of metal layers in the present invention, as opposed to using alternating layers of dielectric materials, results in a reflector that is substantially thinner than a conventional two dielectric reflector.

16 Claims, 2 Drawing Sheets

MULTIPLE BAND REFLECTOR WITH METAL AND DIELECTRIC LAYERS

FIELD OF THE INVENTION

The present invention is in the field of light reflectors in general, and, in particular, the present invention is in the field of multiple layer reflectors comprising dielectric layers that are used to selectively reflect desired wavelengths of light from a light source.

BACKGROUND

Devices that reflect selected wavelengths of light are well known and have been in use for many years. In typical configurations, a reflector is formed by depositing alternating layers of dielectric materials on a substrate. For example, alternating layers of a first dielectric material having a high index of refraction with a second dielectric having a low index of refraction, wherein the alternating layers have a fixed thickness, can produce a reflector that reflects light in the visible spectrum in a pattern that has a single peak intensity. A similar structure that uses two equal thickness dielectric layers separated by a metal layer similarly can result in a reflector that reflects visible light in a pattern that has a single peak intensity (see, for example, U.S. Pat. Nos. 5,214,530 and 6,262,830).

Conventional reflectors, however, can have physical and optical limitations that prevent their use in some applications. For example, alternating dielectric reflectors can have a total layer thickness on the order of 1.5 microns. Furthermore, single peak reflectors may lack the optical qualities that are desirable for some applications—for example, viewing screens that are used for image projection devices.

What are needed in the art are improved optical reflectors that are relatively thin, relatively simple and inexpensive to manufacture, and that provide desirable reflection within the visible spectrum.

SUMMARY OF THE INVENTION

Now, according to the present invention, multiple band optical reflectors are provided that utilize a stack of metal and dielectric layers to create a reflection curve in the visible spectrum that has multiple peak intensities. Reflectors of the present invention comprise at least two dielectric layers that have differing thicknesses, with metal layers disposed therebetween. The use of metal layers in the present invention, as opposed to using alternating layers of dielectric materials, results in a reflector that is substantially thinner than a conventional two dielectric reflector.

DETAILED DESCRIPTION

The present invention provides reflectors that can be used in a wide variety of applications, including, for example, as viewing screens for image projection devices.

Reflectors of the present invention comprise a substrate onto which a stack of metal layers and dielectric layers has been formed. In various embodiments, reflectors of the present invention permit transmission of less than 10 percent or 5 percent of incident light.

As will be described in more detail below, the substrate can be any suitable transparent, translucent, or opaque material. In various embodiments, for example, the substrate can be a polymer film, such as poly(ethylene terephthalate). The substrate can comprise a single material, or the substrate can be a composite, such as a transparent polymer film onto which a layer of light absorbing and/or reflecting material has been deposited, such as a layer of chromium.

A stack of dielectric and metal layers is disposed on the substrate to form the reflector of the present invention. As will be described in detail, below, the metal layers of the stack will have a relatively low absorbance and will have good reflectance qualities. Dielectric layers, which will also be described in detail below, will be chosen based on the desired optical properties and will have different thicknesses.

Figure 1:
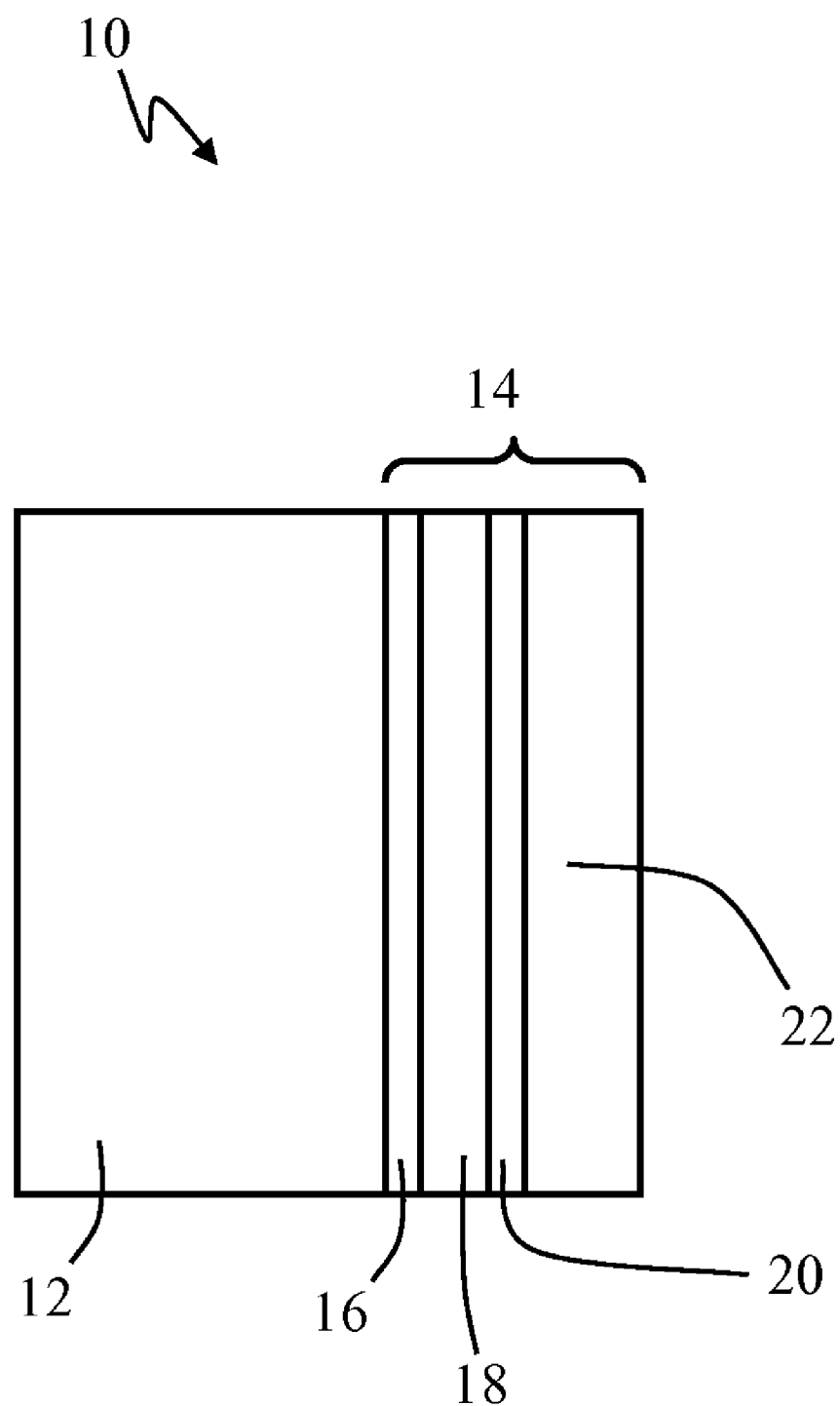
FIG. 1 is a schematic illustration of a cross sectional view of one embodiment of a reflector of the present invention.

As shown in FIG. 1 generally at 10, in various embodiments of the present invention, a stack 14 is disposed in contact with a substrate 12. The stack 14 comprises a first metal layer 16 disposed in contact with the substrate, a first dielectric layer 18 disposed in contact with the first metal layer 16, a second metal layer 20 disposed in contact with the first dielectric layer 18, and a second dielectric layer 22 disposed in contact with the second metal layer 20.

As is apparent in the schematic illustration shown in FIG. 1, the first dielectric layer 18 and the second dielectric layer 22 have different thicknesses. Reflectors of the present invention have dielectric layers that differ in thickness by at least 6% optical thickness. In various embodiments, the first dielectric layer has an optical thickness of at least 8% or at least 10%. While FIG. 1 shows the dielectric layer that is closer to the substrate 12 as the thinner layer, the relative thicknesses can be reversed, with the dielectric layer closer to the substrate 12 having a greater thickness than the second dielectric layer 22.

The first metal layer 16 and the second metal layer 20 comprise high reflectance metals and can have the same thickness or a different thickness and can comprise the same metal composition or different compositions.

In various embodiments of the present invention, the substrate 12 is a non-transparent material that absorbs most or all of the light that penetrates through the stack 14. These embodiments also result in reflectors that allow little or no light to pass.

In yet further embodiments, the substrate 12 can include a layer of light absorbing metal, such as chromium, with the first metal layer 16 disposed directly on the light absorbing material of the substrate 12. These embodiments also result in reflectors that allow little or no light to pass.

In other embodiments the first layer of metal 16 is a reflective material that is sufficiently thick so as to prevent transmission of light. The resulting reflectors allow no light or little light to pass. In various embodiments, a thicker first metal layer 16 can comprise aluminum having a thickness of more than 40 nanometers.

In addition to the basic reflector configuration shown in FIG. 1, reflectors of the present invention include configurations in which more layers of metal and dielectric are added to the stack. In these embodiments, for example, the following layers can be added to the stack disposed in contact with the second dielectric layer 22:

(metal layer/dielectric layer)$_n$ or (dielectric layer)$_n$ or ((metal layer/dielectric layer)$_n$/(dielectric layer)$_m$)

wherein n is 1 to 10 and preferably 1, 2, or 3, m is 1 to 10 and preferably 1 to 5, and wherein the various layers can be the same or different in thickness and composition.

A significant advantage of reflectors of the present invention is the relative thinness of the dielectric/metal stack compared to conventional dielectric/dielectric stacks. Reflectors of the present invention, in various embodiments, have stacks having a thickness of less than 0.6 micrometers, less than 0.5 micrometers, or less than 0.4 micrometers. For embodiments with a greater number of layers, total stack thickness can be somewhat greater.

Figure 2:
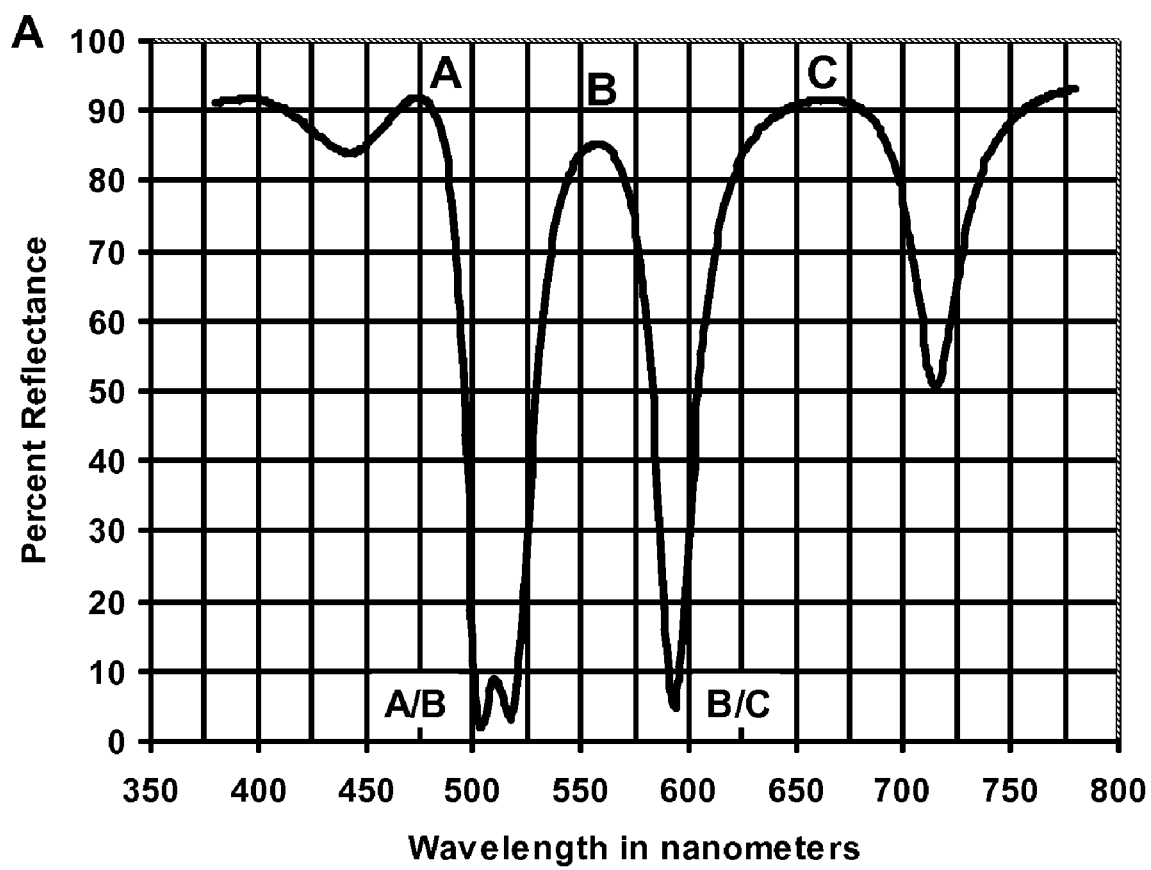
FIG. 2 is a graph of a simulated light reflection spectrum of a reflector of the present invention.

FIG. 2 shows a simulated graph for a reflector of the present invention having three reflection peaks in the visible range, labeled A, B, and C. Valleys between the peaks are labeled A/B and B/C. Reflectors of the present invention have at least two peaks and can have more, for example, three, four, or five peaks. As shown in FIG. 2, between any two adjacent peaks there will be a valley.

Reflectors of the present invention reflect light over the visible spectrum in at least two reflection peaks, wherein the intensity of each reflection peak is at least 45% of incident light at the same wavelength as the reflection peak and the intensity of valleys between said reflection peaks are no more than 50% of the average of the intensity of the two adjacent reflection peaks.

In various embodiments of the present invention, a reflector of the present invention includes a polymer film that is adhered to the final dielectric layer in the stack in order to form a protective barrier. This layer functions to protect the dielectric and metal layers from mechanical and environmental damage that could otherwise cause degradation of the reflector. This second polymer film can comprise any suitable material, as detailed below, and can be the same as or different from the and polymer film substrate that is used as a substrate. The polymer film can be adhered to the dielectric layers with any suitable adhesive, as is known in the art. In various embodiments a spray adhesive is used. In other embodiments, other suitable adhesives can be applied using other means, such as gravure.

In various embodiments, a hardcoat or anti-smudge coat can be used on the top surface of the reflector.

Substrate

Any suitable substrate can be used with reflectors of the present invention, as are conventionally used in the art. Substrates can be transparent, translucent, or opaque. Examples of materials that can be used as substrates include, but are not limited to, glass, rigid plastics, and flexible polymer films. The substrate chosen will depend on numerous factors, such as the desired durability, transparency, and flexibility of the finished reflector.

In various embodiments, a substrate comprises a polymer film. Polymer films of the present invention can be any suitable thermoplastic film that is used in the performance film arts. In various embodiments, the thermoplastic film can comprise polycarbonates, acrylics, nylons, polyesters, polyurethanes, polyolefins such as polypropylene, cellulose acetates and triacetates, vinyl acetals, such as poly(vinyl butyral), polyimide, vinyl chloride polymers and copolymers and the like, or another plastic suitable for use in a performance film, for example, PEEK® (polyetheretherketone). In various embodiments, the thermoplastic film is a polyester film, for example, poly(ethylene terephthalate). In various embodiments, the thermoplastic film is poly(ethylene naphthalate).

In various embodiments the thermoplastic film can have a thickness of 0.012 millimeters to 0.40 millimeters, and preferably 0.07 millimeters to 0.17 millimeters.

The thermoplastic films, in some embodiments, are optically transparent (i.e. objects adjacent one side of the layer can be comfortably seen by the eye of a particular observer looking through the layer from the other side). In various embodiments, the thermoplastic film comprises materials such as re-stretched thermoplastic films having the noted properties, which include polyesters. In various embodiments, poly(ethylene terephthalate) is used that has been biaxially stretched to improve strength, and has been heat stabilized to provide low shrinkage characteristics when subjected to elevated temperatures (e.g. less than 2% shrinkage in both directions after 30 minutes at 150° C.).

Flexible polymer film substrates of the present invention can include one or more primer layers, as are known in the art, to facilitate proper adhesion of the metal layers to the flexible polymer film substrate.

As noted elsewhere herein, substrate layers can comprise a single composition or a composition having multiple components. For example, a substrate can be a composite polymer film that comprises two or more laminated films or a polymer film with a layer of an absorbing and/or reflecting material. Absorbing materials can include, for example, metal layers such as chromium, aluminum, nickel, titanium, silver, or alloys and combinations of the foregoing, and can have any desired thickness that is suitable for use in a reflector. Substrates can also include one or more metal or dielectric layers.

Metal Layers

Metal layers of the present invention can comprise any suitable, low absorbance metal. Useful metals include, without limitation, silver, gold, aluminum, and alloys and combinations of the forgoing, with silver and silver alloys preferred.

Metal layers of the present invention can have any suitable thicknesses, and multiple metal layers within the same reflector can have the same or different thickness and the same or different composition. In general, metal layers are formed to be sufficiently thin so as to have little absorbance while obtaining the desired optical effect. Metal layers—other than first metal layers that are intended to act as an opaque absorber—can have, for example, a thickness of 10-70 nanometers or 15-60 nanometers. Metal layers that are first layers that are intended to block the penetration of light can be, for example, thicker than 50 nanometers.

Metal layers of the present invention can be formed using any suitable method, as are known in the art, for example, with physical vapor deposition such as "sputtering", electron beam evaporation, and variations thereof. In various embodiments, sputtering is the preferred method of fabrication. Exemplary metal layer forming techniques are well known in the art and include, for example, those disclosed in U.S. Pat. No. 2,379,790, U.S. Pat. No. 6,859,323, and "Thin Film Optical Filters", $3^{rd}$ Edition, by H. Angus Macleod.

Dielectric Layers

Dielectric layers of the present invention can comprise any suitable dielectric material that is known in the art and that is conventionally used for interference filters and reflectors. In various examples of the present invention, dielectric layers having a relatively high index of refraction are used to form the dielectric layers. Dielectrics having an index of refraction of greater than 1.8 at 550 nanometers can, for example, be used. Specific dielectrics include, for example and without limitation, TiO2 (titanium dioxide), Nb$_2$O$_5$ (niobium oxide (niobium pentoxide)), tantalum pentoxide, zinc sulfide, In$_2$O$_3$, SnO$_2$, and doped oxides.

As noted previously, the first and the second dielectric layers will have a thickness that differs by at least 6% optical thickness. Dielectric layers can have, for example, a thickness of 40 to 100 nanometers or 50 to 120 nanometers.

Dielectric layers in addition to the first two can be included and can be the same as or different than the first two layers.

Dielectric layers of the present invention can be formed using any suitable method, as are known in the art, for example, with physical vapor deposition such as "sputtering", electron beam evaporation, and variations thereof. In various embodiments, sputtering is the preferred method of fabrication. Exemplary dielectric layer forming techniques are well known in the art and include, for example, those disclosed in U.S. Pat. No. 2,379,790, U.S. Pat. No. 6,859,323, and "Thin Film Optical Filters", 3$^{rd}$ Edition, by H. Angus Macleod.

Anti-Counterfeiting

Reflectors of the present invention can be used as anti-counterfeiting devices by simply attaching, adhering, or otherwise assimilating the reflectors onto an item. Virtually any item onto which a reflector can be securely attached can be protected in this manner. For example, thin strips of one or more reflectors of the present invention can be innocuously incorporated onto or woven into paper currency. Verification of the authenticity of the currency, or other item, can then be performed by simply directing visible light of a known wavelength composition at the reflector and comparing the reflected wavelength to the known reflection spectrum of the reflector. For example, sunlight or other full spectrum light can be directed at a three peak reflector and the reflected spectrum can be analyzed to ensure that three peaks occur where expected. In other examples, light that has been filtered so that only wavelengths that correspond to the valleys of a particular reflector are used, which will result in little or no reflection. As will be apparent to those of skill in the art, many other variations are possible.

Detection of the reflection pattern can be automated, such as with a device, or it can be through simple visual inspection, as could be the case for light/reflector combinations that produce no reflection or reflection of an easily identifiable color.

EXAMPLE COMBINATIONS

The following combinations illustrate, without limitation, various reflector embodiments of the present invention, with thicknesses given in nanometers:

| | Example— | |
|---|---|---|
| | 1 | 2 |
| Layer 1 | Poly(ethylene terephthalate) (0.127 millimeters) | Poly(ethylene terephthalate) (0.127 millimeters) |
| Layer 2 | Chromium (38-42 nm) | Silver (25-29 nm) |
| Layer 3 | Silver (25-29 nm) | Titanium Dioxide (65-69 nm) |
| Layer 4 | Titanium Dioxide (53-57 nm) | Silver (15-19 nm) |
| Layer 5 | Silver (53-57 nm) | Titanium Dioxide (59-63 nm) |
| Layer 6 | Titanium Dioxide (71-75 nm) | Silver (16-20 nm) |
| Layer 7 | Silver (18-22 nm) | Titanium Dioxide (63-67 nm) |
| Layer 8 | Titanium Dioxide (74-78 nm) | Silver (16-20 nm) |

-continued

| | Example— | |
|---|---|---|
| | 1 | 2 |
| Layer 9 | Silver (15-19 nm) | Titanium Dioxide (85-89 nm) |
| Layer 10 | Titanium Dioxide (62-66 nm) | None |
| Layer 11 | Silver (21-25 nm) | None |
| Layer 12 | Titanium Dioxide (89-93 nm) | None |

| | Example— | |
|---|---|---|
| | 3 | 4 |
| Layer 1 | Poly(ethylene terephthalate) (0.127 millimeters) | Poly(ethylene terephthalate) (0.127 millimeters) |
| Layer 2 | Silver (16-20 nm) | Aluminum (38-42 nm) |
| Layer 3 | Titanium Dioxide (124-128 nm) | Titanium Dioxide (69-73 nm) |
| Layer 4 | Silver (12-16 nm) | Silver (51.5-55.5 nm) |
| Layer 5 | Titanium Dioxide (67-71 nm) | Titanium Dioxide (75-79 nm) |
| Layer 6 | Silver (21-25 nm) | Silver (19.5-23.5 nm) |
| Layer 7 | Titanium Dioxide (63-67 nm) | Titanium Dioxide (77-81 nm) |
| Layer 8 | Silver (25-29 nm) | Silver (18.5-22.5 nm) |
| Layer 9 | Titanium Dioxide (65-69 nm) | Titanium Dioxide (68-72 nm) |
| Layer 10 | None | Silver (24-28 nm) |
| Layer 11 | None | Titanium Dioxide (117-121 nm) |

The present invention includes projection screens comprising any of the reflectors of the present invention described herein.

The present invention includes methods of reflecting light from a light source, comprising the steps of disposing a reflector of the present invention in the path of light from a light source, and, reflecting the light off of the reflector.

The present invention includes methods for modifying the reflected color of incident light by modifying the relative intensities of an incident wavelength spectrum using a reflector of the present invention.

The present invention includes devices and articles employing a reflector of the present invention as an anti-counterfeiting measure.

The present invention includes methods of detecting a non-counterfeit device or item employing a reflector of the present invention comprising directing a light of known wavelengths on the device or item and recognizing the reflected light pattern.

By virtue of the present invention reflectors are provided that offer many benefits over conventional alternating dielectric layer reflectors.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeable with any ranges, values, or characteristics given for any of the other components of the invention, where compatible, to form an embodiment having defined values for each of the components, as given herein throughout.

Any figure reference numbers given within the abstract or any claims are for illustrative purposes only and should not be construed to limit the claimed invention to any one particular embodiment shown in any figure.

Unless otherwise noted, drawings are not drawn to scale.

Each reference, including journal articles, patents, applications, and books, referred to herein is hereby incorporated by reference in its entirety.

We claim:

1. A multiple band visible light reflector, comprising:
    a substrate;
    a stack disposed on said substrate or on one or more intervening layers that are disposed on said substrate, wherein said stack comprises:
        a first metal layer disposed in contact with said substrate;
        a first dielectric layer disposed in contact with said first metal layer;
        a second metal layer disposed in contact with said first dielectric layer;
        a second dielectric layer disposed in contact with said second metal layer;
        a third metal layer disposed in contact with said second dielectric layer;
        a third dielectric layer disposed in contact with said third metal layer;
        a fourth metal layer disposed in contact with said third dielectric layer; and,
        a fourth dielectric layer disposed in contact with said fourth metal layer;
    wherein said first dielectric layer and said second dielectric layer have a difference in thickness of at least 6 percent optical thickness;
    wherein each of said first dielectric layer, said second dielectric layer, said third dielectric layer, and said fourth dielectric layer has a thickness of 40 to 100 nanometers;
    wherein said reflector reflects light over the visible spectrum in at least two reflection peaks, wherein the intensity of each reflection peak is at least 45% of incident light at the same wavelength as said each reflection peak and the intensity of valleys between said reflection peaks are no more than 50% of the average intensities of said reflection peaks; and,
    wherein said stack has a thickness of less than 0.5 microns.

2. The reflector of claim 1, wherein said substrate is transparent and flexible.

3. The reflector of claim 1, wherein said substrate is poly (ethylene terephthalate).

4. The reflector of claim 1, wherein said substrate has a metallized surface disposed in contact with said first metal layer.

5. The reflector of claim 4, wherein said metallized surface comprises chromium or aluminum having a thickness of at least 40 nanometers.

6. The reflector of claim 1, wherein said reflector absorbs any visible light that is not reflected.

7. The reflector of claim 1, wherein a portion of any visible light that is not reflected is transmitted.

8. The reflector of claim 1, wherein said first metal layer and said second metal layer each comprise silver.

9. The reflector of claim 1, wherein said first metal layer has a thickness of 15 to 60 nanometers.

10. The reflector of claim 1, wherein said second metal layer has a thickness of 15 to 60 nanometers.

11. The reflector of claim 1, wherein said first dielectric layer and said second dielectric layer have an optical thickness difference of at least 8%.

12. The reflector of claim 1, wherein said first dielectric layer and said second dielectric layer have an optical thickness difference of at least 10%.

13. The reflector of claim 1, wherein said first dielectric layer and said second dielectric layer comprise the same material.

14. The reflector of claim 1, wherein said first dielectric layer and said second dielectric layer comprise different materials.

15. The reflector of claim 1, wherein said first dielectric layer comprises $TiO_2$, $Nb_2O_5$, $MgF_2$, $Ta_2O_5$, $SiO_2$, $In_2O_3$, $SnO_2$, or Indium Tin Oxide, and said second dielectric layer comprises $TiO_2$, $Nb_2O_5$, $MgF_2$, $Ta_2O_5$, $SiO_2$, $In_2O_3$, $SnO_2$, or Indium Tin Oxide.

16. The reflector of claim 1, wherein said first dielectric layer comprises $TiO_2$, $Nb_2O_5$, or $SiO_2$ and said second dielectric layer comprises $TiO_2$, $Nb_2O_5$, or $SiO_2$.

* * * * *